United States Patent
Kim et al.

(10) Patent No.: US 10,637,707 B2
(45) Date of Patent: Apr. 28, 2020

(54) MODEM PERFORMING MODULATION OR DEMODULATION BASED ON LENGTH OF BURST IN DATA PACKET, AND METHOD PERFORMED BY THE MODEM

(71) Applicant: ELECTRONICS AND TELECOMMUNICATIONS RESEARCH INSTITUTE, Daejeon (KR)

(72) Inventors: Pansoo Kim, Daejeon (KR); Deock Gil Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/017,810

(22) Filed: Jun. 25, 2018

(65) Prior Publication Data

US 2019/0260626 A1 Aug. 22, 2019

(30) Foreign Application Priority Data

Feb. 22, 2018 (KR) .................. 10-2018-0021230

(51) Int. Cl.
*H04L 27/26* (2006.01)
(52) U.S. Cl.
CPC ...... *H04L 27/2649* (2013.01); *H04L 27/2608* (2013.01); *H04L 27/2614* (2013.01); *H04L 27/2627* (2013.01); *H04L 27/2657* (2013.01)
(58) Field of Classification Search
CPC ............. H04L 27/2649; H04L 27/2608; H04L 27/2614; H04L 27/2627; H04L 27/2657; H03M 1/126

USPC .................................................. 375/355–376
See application file for complete search history.

(56) References Cited

U.S. PATENT DOCUMENTS

| | | | | | |
|---|---|---|---|---|---|
| 5,680,143 A | * | 10/1997 | Hershey | ............... | G01S 13/82 342/118 |
| 5,835,529 A | * | 11/1998 | Koga | ................. | H04B 1/713 375/131 |
| 6,359,926 B1 | * | 3/2002 | Isaksson | ............ | H04L 1/0025 375/219 |
| 6,404,778 B1 | * | 6/2002 | Hayashi | ............ | H04B 7/2618 370/280 |

(Continued)

FOREIGN PATENT DOCUMENTS

KR  10-2006-0113523 A  11/2006

OTHER PUBLICATIONS

Pansoo Kim et al., "A Dual-Mode Symbol Timing Recovery for Dvb-Rcs2 Standard", 2017 Joint Conference Commercial Space Applications: Transformation, Fusion, and Competition, Oct. 16-19, 2017, pp. 1-8.

(Continued)

*Primary Examiner* — James M Perez

(57) ABSTRACT

Disclosed is a demodulation method to be used by an apparatus receiving a data packet transmitted in wired and wireless communications to recover data from a received signal. The apparatus receiving the data packet may recover or synchronize a symbol timing that is used to recover the data, and a demodulator included in the apparatus receiving the data packet may determine the symbol timing through different methods based on a length of a burst included in the data packet.

11 Claims, 9 Drawing Sheets

(56) References Cited

U.S. PATENT DOCUMENTS

| | | | | |
|---|---|---|---|---|
| 6,606,341 B1* | 8/2003 | Kanterakis | H04B 7/2628 | 370/342 |
| 6,768,780 B1* | 7/2004 | Lakkis | H04L 7/027 | 375/355 |
| 6,876,675 B1* | 4/2005 | Jones | H04L 27/2662 | 370/208 |
| 6,904,273 B2* | 6/2005 | Steber | H03G 3/3052 | 375/345 |
| 6,961,314 B1* | 11/2005 | Quigley | H04J 3/0682 | 370/252 |
| 7,457,378 B1* | 11/2008 | Sher | H04B 1/0014 | 375/340 |
| 7,554,937 B2* | 6/2009 | Lim | H04B 7/1858 | 370/316 |
| 7,649,926 B2* | 1/2010 | Kang | H04B 1/707 | 375/147 |
| 7,706,490 B2* | 4/2010 | Bouillet | H03K 5/135 | 375/355 |
| 7,769,105 B1* | 8/2010 | McIntire | G01S 7/006 | 375/309 |
| 7,894,557 B2* | 2/2011 | Richardson | H01Q 3/267 | 375/343 |
| 7,903,691 B2* | 3/2011 | Hwang | H04W 72/0406 | 370/491 |
| 7,929,498 B2* | 4/2011 | Ozluturk | G06F 13/374 | 370/317 |
| 8,135,082 B2* | 3/2012 | Choi | H04L 1/0041 | 375/264 |
| 8,248,975 B2* | 8/2012 | Fujita | H04L 25/0232 | 370/208 |
| 8,259,646 B2* | 9/2012 | Kim | H04L 7/042 | 370/326 |
| 8,275,077 B1* | 9/2012 | Nelson | H04L 27/2278 | 375/262 |
| 8,477,813 B2* | 7/2013 | Zhang | H04L 25/03343 | 370/510 |
| 8,731,032 B2* | 5/2014 | Kim | H04L 27/2003 | 342/174 |
| 8,831,121 B1* | 9/2014 | Qi | H04L 27/2653 | 375/260 |
| 8,855,144 B2* | 10/2014 | Hwang | H04W 72/0406 | 370/491 |
| 8,861,551 B2* | 10/2014 | Hwang | H04W 72/0406 | 370/491 |
| 8,891,592 B1* | 11/2014 | Zhang | H04W 56/00 | 375/149 |
| 8,891,662 B2* | 11/2014 | Jeong | H04L 5/0051 | 375/232 |
| 8,958,504 B2* | 2/2015 | Warke | H04L 27/0014 | 375/235 |
| 9,209,960 B1* | 12/2015 | Leung | H04L 7/002 | |
| 9,497,134 B1* | 11/2016 | Chen | H04L 47/625 | |
| 9,647,719 B2* | 5/2017 | MacMullan | H04B 1/1027 | |
| 9,692,492 B2* | 6/2017 | You | H04B 7/0413 | |
| 9,774,484 B2* | 9/2017 | Kessel | H04L 27/2649 | |
| 9,867,166 B2* | 1/2018 | Hwang | H04L 5/0048 | |
| 10,033,491 B2* | 7/2018 | Kang | H04J 11/00 | |
| 10,038,479 B2* | 7/2018 | Seo | H04L 1/0631 | |
| 10,194,374 B2* | 1/2019 | Kim | H04W 76/10 | |
| 10,320,596 B2* | 6/2019 | Thompson | H04B 1/10 | |
| 10,327,213 B1* | 6/2019 | Han | H04L 25/03343 | |
| 2001/0001616 A1* | 5/2001 | Rakib | H03M 13/256 | 375/259 |
| 2002/0131528 A1* | 9/2002 | Clewer | H04B 7/18517 | 375/316 |
| 2002/0154620 A1* | 10/2002 | Azenkot | H04L 5/026 | 370/347 |
| 2003/0072382 A1* | 4/2003 | Raleigh | H04B 7/0615 | 375/267 |
| 2004/0004934 A1* | 1/2004 | Zhu | H04L 27/2657 | 370/208 |
| 2004/0005018 A1* | 1/2004 | Zhu | H04L 27/2657 | 375/340 |
| 2004/0008729 A1* | 1/2004 | Rogerson | H03K 3/0315 | 370/478 |
| 2004/0100941 A1* | 5/2004 | Lim | H04B 7/1858 | 370/349 |
| 2004/0105516 A1* | 6/2004 | Smith | H03L 7/07 | 375/354 |
| 2004/0114552 A1* | 6/2004 | Lim | H04B 7/2041 | 370/324 |
| 2005/0058229 A1* | 3/2005 | Alagha | H04B 7/18523 | 375/346 |
| 2005/0099939 A1* | 5/2005 | Huh | H04L 27/2626 | 370/210 |
| 2005/0185743 A1* | 8/2005 | Li | H04L 7/042 | 375/350 |
| 2005/0251726 A1* | 11/2005 | Takamura | H03M 13/2707 | 714/755 |
| 2007/0133725 A1* | 6/2007 | Kim | H04B 7/18523 | 375/354 |
| 2008/0043858 A1* | 2/2008 | Lim | H04J 11/00 | 375/260 |
| 2009/0091482 A1* | 4/2009 | Oshima | H03M 1/1004 | 341/120 |
| 2009/0141840 A1* | 6/2009 | Twitto | H04L 1/0045 | 375/346 |
| 2009/0154616 A1* | 6/2009 | Jin | H04L 27/0014 | 375/344 |
| 2009/0168730 A1* | 7/2009 | Baum | H04L 5/0007 | 370/336 |
| 2009/0196279 A1* | 8/2009 | Kim | H04J 11/0069 | 370/350 |
| 2009/0196385 A1* | 8/2009 | Hunter | G01S 13/788 | 375/350 |
| 2009/0207944 A1* | 8/2009 | Furman | H04L 7/042 | 375/329 |
| 2009/0219873 A1* | 9/2009 | Higuchi | H04J 13/00 | 370/329 |
| 2009/0251616 A1* | 10/2009 | Seo | H04N 5/4401 | 348/726 |
| 2009/0274174 A1* | 11/2009 | Hwang | H04W 72/0406 | 370/480 |
| 2009/0285137 A1* | 11/2009 | Fujita | H04L 25/0232 | 370/310 |
| 2010/0039985 A1* | 2/2010 | Kim | H04L 7/042 | 370/326 |
| 2010/0054379 A1* | 3/2010 | Eymann | H04L 27/22 | 375/344 |
| 2010/0158179 A1* | 6/2010 | Becker | H04L 7/0029 | 375/355 |
| 2011/0051612 A1* | 3/2011 | Van Driest | H04B 1/7075 | 370/252 |
| 2011/0069738 A1* | 3/2011 | Sugino | G01S 13/0209 | 375/130 |
| 2011/0090918 A1* | 4/2011 | Umehara | H04L 5/0048 | 370/442 |
| 2011/0116411 A1* | 5/2011 | Hwang | H04W 72/0406 | 370/252 |
| 2011/0116516 A1* | 5/2011 | Hwang | H04W 72/0406 | 370/480 |
| 2011/0150149 A1* | 6/2011 | Lee | H04L 5/0023 | 375/343 |
| 2012/0087403 A1* | 4/2012 | Kim | H04L 27/2003 | 375/226 |
| 2013/0315346 A1* | 11/2013 | Varma | H04L 7/0008 | 375/316 |
| 2014/0062751 A1* | 3/2014 | Gopinathan | H03M 1/127 | 341/158 |
| 2014/0119458 A1* | 5/2014 | Limberg | H04N 19/89 | 375/240.27 |
| 2014/0161209 A1* | 6/2014 | Limberg | H04L 5/0016 | 375/299 |
| 2014/0307818 A1* | 10/2014 | Jindal | H04W 28/0215 | 375/267 |
| 2015/0002324 A1* | 1/2015 | Sharma | H03M 1/124 | 341/122 |

(56) References Cited

U.S. PATENT DOCUMENTS

| | | | |
|---|---|---|---|
| 2016/0112147 A1* | 4/2016 | Seo | H04B 17/309 375/224 |
| 2016/0294584 A1* | 10/2016 | Teplitsky | H04L 25/06 |
| 2016/0308610 A1* | 10/2016 | An | H04Q 11/0066 |
| 2016/0337723 A1* | 11/2016 | Graves | H04Q 11/0005 |
| 2017/0026205 A1* | 1/2017 | Agee | H04L 25/08 |
| 2017/0063384 A1* | 3/2017 | Chi | H03L 7/0807 |
| 2017/0141906 A1* | 5/2017 | Rainish | H04L 5/0073 |
| 2017/0164230 A1* | 6/2017 | You | H04W 28/04 |
| 2017/0302330 A1* | 10/2017 | Jayasimha | H04L 1/04 |
| 2018/0115967 A1* | 4/2018 | Ahn | H04W 72/044 |
| 2018/0241460 A1* | 8/2018 | Hong | H04B 7/185 |
| 2018/0249467 A1* | 8/2018 | Zheng | H04L 27/2607 |
| 2018/0302183 A1* | 10/2018 | Liu | H04J 3/1652 |
| 2018/0343555 A1* | 11/2018 | Johnson | H04W 48/16 |
| 2019/0007971 A1* | 1/2019 | Yoshimura | H04W 28/06 |
| 2019/0260626 A1* | 8/2019 | Kim | H04L 7/0079 |

OTHER PUBLICATIONS

"Digital Video Broadcasting (DVB); Second Generation DVB Interactive Satellite System (DVB-RCS2); Part 2: Lower Layers for Satellite standard", ETSI EN 301 545-2, V1.2.1, Apr. 2014, pp. 1-239, ETSI.

"Digital Video Broadcasting (DVB); Interaction channel for satellite distribution systems", ETSI EN 301 790, V1.5.1, May 2009, pp. 1-166, ETSI.

Martin Oerder et al., "Digital Filter and Square Timing Recovery", IEEE Transactions on Communications, May 1988, pp. 605-612, vol. 36, No. 5, IEEE.

Hartmut Brandt et al., "Digital video broadcasting-return channel via satellite linear modulation with turbo coding", International Journal of Satellite Communications and Networking, Mar. 20, 2013, pp. 49-59, vol. 32, John Wiley & Sons, Ltd.

Pansoo Kim et al., "Low Complexity Carrier Phase Recovery for DVB-RCS2 Standard", ICTC 2012, 2012, pp. 607-609, IEEE.

* cited by examiner

MODEM PERFORMING MODULATION OR DEMODULATION BASED ON LENGTH OF BURST IN DATA PACKET, AND METHOD PERFORMED BY THE MODEM

CROSS-REFERENCE TO RELATED APPLICATION(S)

This application claims the priority benefit of Korean Patent Application No. 10-2018-0021230 filed on Feb. 22, 2018, in the Korean Intellectual Property Office, the disclosure of which is incorporated herein by reference for all purposes.

BACKGROUND

1. Field

One or more example embodiments relate to an apparatus and method for modulating or demodulating a signal.

2. Description of Related Art

A recent wired and wireless communication transmission and reception apparatus may use a data transmission protocol by combining a header with an Internet protocol (IP)-based packet. By streamlining a process of generating such an IP packet, or an encapsulation process of converting a packet in a network layer to a packet in a physical layer, it is possible to reduce overhead data included in the packet and increase data transmission efficiency. In such a process, it is required to flexibly generate, combine, and divide a packet based on a length of data. In addition, a small packet or data may be frequently used to transmit control information in addition to traffic data.

SUMMARY

An aspect provides a demodulator configured to determine whether to control a sampling clock used to demodulate a received data packet based on a length of a burst included in the data packet while demodulating the data packet, and a method performed by the demodulator. The aspect also provides a transmission method that may minimize a performance loss without increasing a complexity of the demodulator.

Another aspect also provides a modulator configured to adjust a transmission length of a packet to minimize a performance loss that may occur in a demodulator without increasing a complexity of the demodulator.

According to an aspect, there is provided a demodulation method performed by a demodulator to demodulate an analog signal, the demodulation method including converting the analog signal to a digital signal, identifying a type of a burst included in the digital signal, and determining a sampling clock to be used to demodulate the analog signal based on the identified type of the burst.

The determining of the sampling clock may include determining a symbol timing to be used to determine the sampling clock based on the identified type of the burst or a length of the burst.

In response to the length of the burst being less than or equal to a preset threshold, the determining of the symbol timing may include calculating a correlation between the digital signal and a preset symbol pattern, obtaining a time-domain complex signal vector corresponding to the digital signal by combining calculated correlations, and determining a power distribution of the digital signal to be used to determine the sampling clock based on the obtained complex signal vector.

The calculating of the correlation may include calculating the correlation between the digital signal and the symbol pattern by each preset sub-correlation window unit.

The determining of the power distribution may include identifying a time index that is closest to a maximum value of the power distribution and an offset between the time index and the maximum value of the power distribution.

In response to the length of the burst being greater than a preset threshold, the determining of the symbol timing may include applying, to the digital signal, a nonlinear operation based on the number of oversampling per symbol used to obtain the digital signal and the number of symbol included in a window corresponding to the digital signal.

According to another aspect, there is provided a modulation method performed by a modulator, the modulation method including determining a length of a burst to be transmitted to a demodulator corresponding to the modulator based on a length of payload data, comparing the determined length of the burst to a preset threshold and a timeslot, determining a length of at least one of a preamble, a pilot field, or a postamble that is associated with the burst, based on a result of comparing the length of the burst to the preset threshold and the timeslot, and modulating the payload data to generate the burst based on the determined length of the at least one of the preamble, the pilot field, or the postamble.

In response to the length of the burst being less than or equal to the threshold, the determining of the length of the at least one of the preamble, the pilot field, or the postamble may include increasing the length of the at least one of the preamble, the pilot field, or the postamble.

In response to the length of the burst being less than the timeslot, the determining of the length of the at least one of the preamble, the pilot field, or the postamble may include decreasing the length of the at least one of the preamble, the pilot field, or the postamble.

According to still another aspect, there is provided a demodulation method performed by a demodulator to demodulate an analog signal, the demodulation method including converting the analog signal to a digital signal, identifying a length of a burst included in the digital signal, determining a symbol timing of the analog signal using the digital signal based on the identified length of the burst, and demodulating the digital signal based on the determined symbol timing. The determining of the symbol timing may include determining the symbol timing based on one of a symbol pattern and a nonlinear operation that is selected based on the length of the burst.

The determining of the symbol timing may include at least one of determining the symbol timing based on a relationship between the digital signal and the symbol pattern in response to the length of the burst being less than or equal to the threshold, or determining the symbol timing by applying the nonlinear operation to a data packet included in the digital signal in response to the length of the burst being greater than the threshold.

The determining of the symbol timing based on the relationship between the digital signal and the symbol pattern may include calculating a correlation between the digital signal and a preset symbol pattern of a preamble field, a postamble field, or a pilot field, generating a time-domain complex signal vector of the digital signal from the calculated correlation, measuring power of the digital signal from the generated complex signal vector, and determining the symbol timing based on a peak value of the measured power.

The determining of the symbol timing by applying the nonlinear operation to the data packet may include applying, to the data packet, the nonlinear operation based on the number of oversampling per symbol or the number of symbol included in a window corresponding to the digital signal to determine a size of the data packet used to determine the symbol timing.

According to yet another aspect, there is provided a demodulator configured to demodulate an analog signal, the demodulator including an analog-to-digital converter (ADC) configured to convert the analog signal to a digital signal, a burst detector configured to detect a burst included in the digital signal, a symbol timing recoverer configured to determine a symbol timing of the digital signal based on a length of the burst, and a frequency recoverer configured to recover a frequency of the digital signal based on the determined symbol timing. The symbol timing recoverer may determine the symbol timing based on one of a symbol pattern and a nonlinear operation that is selected based on the length of the burst.

The symbol timing recoverer may determine the symbol timing based on a relationship between the digital signal and the symbol pattern in response to the length of the burst being less than or equal to a preset threshold, and determine the symbol timing by applying the nonlinear operation to a data packet included in the digital signal in response to the length of the burst being greater than the threshold.

In response to the symbol timing being determined based on the relationship between the digital signal and the symbol pattern, the symbol timing recoverer may calculate a correlation between the digital signal and a preset symbol pattern of a preamble field, a postamble field, or a pilot field, generate a time-domain complex signal vector of the digital signal from the calculated correlation, measure power of the digital signal from the generated complex signal vector, and determine the symbol timing based on a peak value of the measured power.

In response to the symbol timing being determined by applying the nonlinear operation to the data packet, the symbol timing recoverer may apply, to the data packet, the nonlinear operation based on the number of oversampling per symbol or the number of symbol included in a window corresponding to the digital signal to determine a size of the data packet used to determine the symbol timing.

Herein, whether to control a sampling clock used to demodulate a received data packet may be determined based on a length of a burst included in the data packet.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
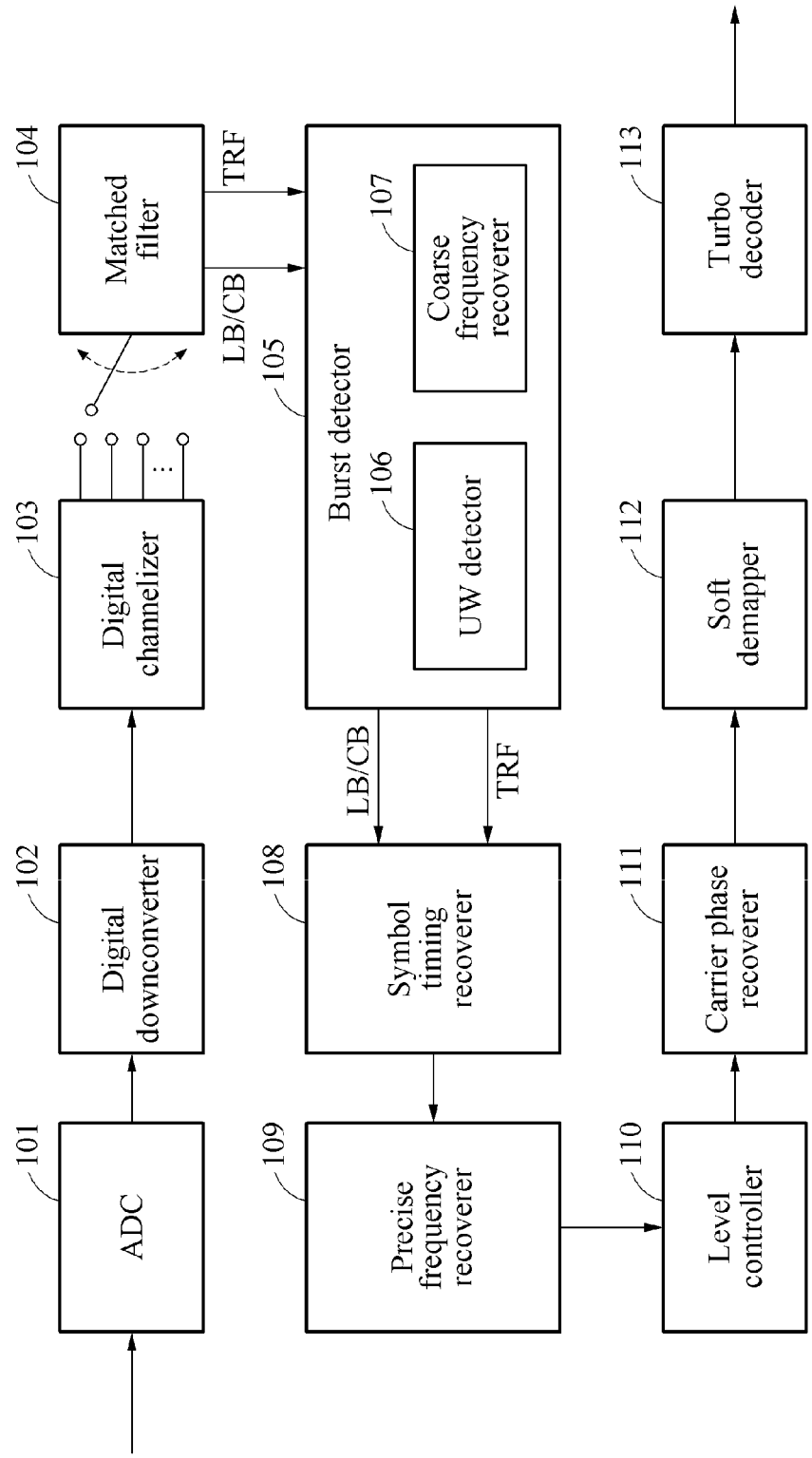
FIG. 1 is a diagram illustrating an example of an architecture of a demodulator at a receiving end according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to limit the present disclosure. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s).

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of an architecture of a demodulator at a receiving end according to an example embodiment. The demodulator may be disposed at a gateway, and based on the digital video broadcasting return channel system via satellite second generation (DVB-RCS2, ETSI EN 301 545-2) standard. The demodulator may also be applied to digital communication devices of various networks, in addition to the DVB-RCS2 standard. The demodulator may be included in a user terminal connected to a network or a base station.

An analog signal passing through a wireless channel may reach an antenna connected to the demodulator. The analog signal received through the antenna may be transferred to a low-noise block (LNB). In the LNB, a frequency of the analog signal may be downconverted. An analog frequency downconversion may be performed again on the downconverted analog signal, and thus the analog signal may have a low intermediate frequency (IF) through the analog frequency downconversion.

The analog signal with the low IF may be input to the demodulator. Referring to FIG. 1, the demodulator includes an analog-to-digital converter (ADC) 101 configured to convert an analog signal to a digital signal. The digital signal obtained by the ADC 101 may include a digital sample sequence. The demodulator also includes a digital downconverter 102 configured to convert the digital signal output from the ADC 101 to a baseband digital signal. In the digital converter 102, the digital sample sequence included in the digital signal may be converted to the baseband digital signal.

The demodulator also includes a digital channelizer 103 configured to receive the digital signal from the digital downconverter 102. In the digital channelizer 103, serialization may be performed on the digital signal, which is a parallel signal. Herein, in a case of orthogonal frequency-division multiplexing (OFDM), a fast Fourier transform (FFT) may be performed. The demodulator also includes a matched filter 104 configured to perform filtering on the digital signal serialized by the digital channelizer 103.

The demodulator also includes a burst detector 105 configured to detect a burst included in the digital signal obtained through the filtering performed by the matched filter 104. The burst detector 105 may identify a start point of the burst included in the digital signal by performing unique word (UW) detection using a UW detector 106. In addition, the burst detector 105 may estimate an offset of a carrier frequency, or a frequency of a carrier wave included in the digital signal, or reduce the estimated offset, using a coarse frequency recoverer 107 which is also referred to as a coarse frequency offset compensator.

As illustrated in FIG. 1, the digital signal output from the burst detector 105 may be classified into a log-on burst (LB), a control burst (CB), and a traffic (TRF) burst (TB) based on a type of a data packet included in the digital signal. Table 1 indicates an architecture of the data packet that includes, for example, a type and a length of a burst based on the data packet.

TABLE 1

| WF ID | Burst length (symbol) | Mod. | Code Rate | Pre length | Post length | Pilot Period | Pilot Block | Pilot Sum |
|---|---|---|---|---|---|---|---|---|
| 1 (LB) | 664 | QPSK | 1/3 | 155 | 27 | 18 | 1 | 26 |
| 2 (CB) | 262 | QPSK | 1/3 | 41 | 41 | 15 | 1 | 12 |
| 3 (STB3) | 536 | QPSK | 1/3 | 27 | 27 | 18 | 1 | 26 |
| 13 (LTB3) | 1616 | QPSK | 1/3 | 34 | 31 | 20 | 1 | 77 |

Referring to FIG. 1, LB and CB may be packets for transmitting control information used for network connection and synchronization maintenance. STB3 and LTB3 may be packets for transmitting traffic data. Herein, a packet that transmits control data may have a relatively shorter length.

The demodulator also includes a symbol timing recoverer 108 configured to recover a symbol timing of the digital signal that is divided based on a type of the data packet. The digital signal may be input to the symbol timing recoverer 108. A detailed operation of the symbol timing recoverer 108 will be described hereinafter.

In an example, the demodulator includes a precise frequency recoverer 109 configured to recover a frequency of the digital signal output from the symbol timing recoverer 108. In the precise frequency recoverer 109, a maximum likelihood (ML)-based FFT algorithm may be used to recover a frequency of the digital signal. In addition to the FFT algorithm, various algorithms may be used to recover a frequency of the digital signal based on an operating signal-to-noise ratio (SNR) and a location of a pilot symbol in the digital signal.

The demodulator also includes a level controller 110 configured to control a magnitude of the digital signal output from the precise frequency recoverer 109. The magnitude of the digital signal may thus be adjusted by the level controller 110. The demodulator also includes a carrier phase recoverer 111 configured to recover a phase of a carrier wave included in the digital signal of which the magnitude is adjusted by the level controller 110.

The demodulator also includes a soft demapper configured to classify, into bits, a transmission symbol included in the digital signal of which the phase of the carrier wave is recovered by the carrier phase recoverer 111. The soft demapper 112 may output a result of a soft decision on the transmission symbol into the bits. The demodulator also includes a turbo decoder 113 configured to demodulate the digital signal based on the result output from the soft demapper 112.

The symbol timing recoverer 108 of the demodulator may determine a sampling clock used to generate the digital signal to be a clock that maximizes an SNR of a received signal of the demodulator.

Figure 2:
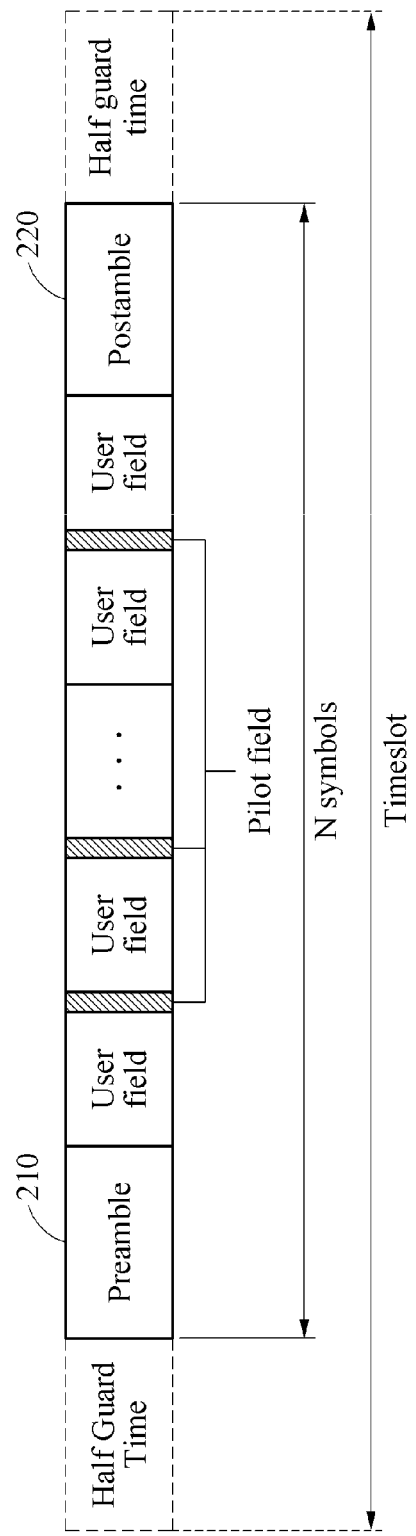
FIG. 2 is a diagram illustrating an example of an architecture of a data packet of a physical layer that is received by a demodulator according to an example embodiment.

FIG. 2 is a diagram illustrating an example of an architecture of a data packet of a physical layer that is received by a demodulator according to an example embodiment. Herein, the architecture of the data packet of the physical layer may be determined based on a DVB=RCS2 standard.

Referring to FIG. 2, the data packet includes N symbols to be transmitted within a timeslot. The data packet includes a preamble field 210, a user field including traffic data, a pilot field, and a postamble field 220. In a case in which a user terminal performs a packet-based connection or access to a base station, a slotted aloha method may be used. In such a case, to overcome a connection or access timing offset that may occur when using the slotted aloha method, a half guard time or interval may be included in the timeslot.

In a case in which the user terminal and the base station are connected based on an orthogonal frequency-division multiple access (OFDMA) method, the preamble field 210, the user field including the traffic data, the pilot field, and the postamble field 220 of the data packet may be present two-dimensionally with regard to time and frequency. A length and an interval (or period) of each of a guard time, for example, the half guard time as illustrated in FIG. 2, the preamble field 210, the pilot field, and the postamble field 220 may be determined based on a channel environment and an operating SNR. The length and the interval (or period) of each of the guard time, for example, the half guard time, the preamble field 210, the pilot field, and the postamble field 220 may be transferred through signaling information of a control channel of a forward link, which is a link from the base station to the user terminal. The user terminal may generate the data packet of the physical layer based on information transferred from the base station.

When the data packet illustrated in FIG. 2 is transmitted through a wireless channel, a timing offset and a carrier frequency offset, for example, may occur due to a discrepancy in clock between a device receiving the data packet, for example, the user terminal or the base station, and a device transmitting the data packet. To compensate for such offsets, the demodulator may demodulate the data packet using a field that is known in advance to include a symbol of a certain pattern, for example, the preamble field 210, the pilot field, and the postamble field 220. The demodulator may select a demodulation algorithm that maximizes performance based on such an already known pattern and perform the selected demodulation algorithm.

Due to a reduction in an antenna size and a need for low-power transmission, there is a growing demand for a transmitting and receiving device that may operate in a lower SNR environment. In addition, it is frequently necessary to transmit data with a relatively short length of a packet. In such a situation, the demodulator may select a demodulation algorithm that maximizes performance based on the known pattern, and may thus prevent degradation that may occur in a transmission process. In detail, although the length of the data packet is relatively short, the demodulator may improve transmission performance by applying different methods to determine a symbol timing based on a length or a type of the data packet.

Figure 3:
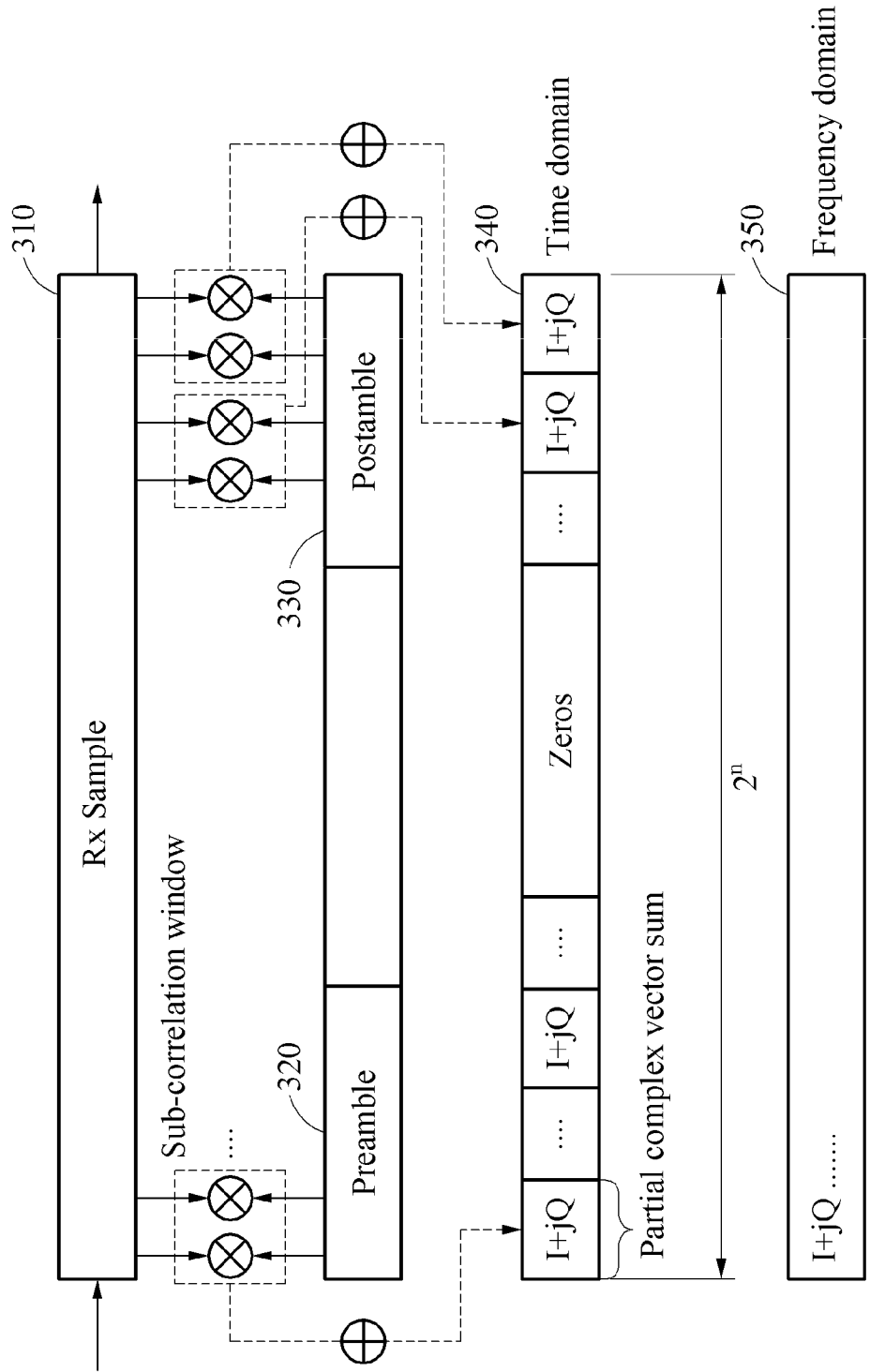
FIG. 3 is a diagram illustrating an example of how a symbol timing recoverer of a demodulator determines a symbol timing according to an example embodiment.

FIG. 3 is a diagram illustrating an example of how a symbol timing recoverer of a demodulator determines a symbol timing according to an example embodiment. A digital signal passing through a burst detector, for example, the burst detector 105 of FIG. 1, may be an oversampled signal, for example, an Rx sample 310 of FIG. 3, and stored in a buffer of a symbol timing recoverer.

Referring to FIG. 3, the symbol timing recoverer may calculate a correlation between the oversampled signal stored in the buffer of the symbol timing recoverer and a previously known symbol pattern as a symbol pattern that is included in a field included in a data packet, for example, a symbol pattern of a preamble field 320 or a symbol pattern of a postamble field 330.

Through such a correlation, energy of the signal stored in the buffer may be collected. Herein, based on a carrier frequency offset and an additive white Gaussian noise (AWGN) environment, the symbol timing recoverer may perform a partial correlation and a summation by a length of a sub-correlation window that is determined based on a residual carrier frequency offset remaining in a coarse frequency recoverer. In detail, the length of the sub-correlation window may be determined to be shorter as the residual carrier frequency offset is greater, and to be longer as the residual carrier frequency offset is smaller. The length of the sub-correlation window may be determined based on performance of the coarse frequency recoverer. The performance of the coarse frequency recoverer may be determined based on an operating SNR and a complexity of a frequency recovery algorithm that is used by the coarse frequency recoverer. For example, a symbol length or period of the sub-correlation window may be 8.

As illustrated, the symbol timing recoverer may calculate, by each sub-correlation window unit, a correlation between the Rx sample 310 stored in the buffer, and the symbol pattern of the preamble field 320 and the symbol pattern of the postamble field 330 that are known in advance, and obtain a partial complex signal vector sum as a complex value.

The symbol timing recoverer may determine a complex signal vector 340 by combining partial complex signal vector sums that are obtained for sub-correlation window units. A length of the partial complex signal vector sums may correspond to a length on which an FFT operation may be performed, and the symbol timing recoverer may fill remaining fields of the complex signal vector 340 with zeros. A total length of the complex signal vector 340 filled with zeros may be $2^n$, in which n denotes a positive integer. The symbol timing recoverer may perform the FFT operation on the complex signal vector 340 having the length of $2^n$. As illustrated in FIG. 3, the symbol timing recoverer may obtain a frequency-domain complex signal vector 350 by performing the FFT operation on the complex signal vector 340, which is a time-domain complex signal vector.

The symbol timing recoverer may perform a squaring operation on a complex value of the complex signal vector 350 to calculate power of the oversampled signal. The symbol timing recoverer may determine a symbol timing offset in a symbol interval using a digital sample sequence, from the calculated power. Herein, an operation of determining a symbol timing may be a data-aided operation used to determine a symbol timing based on data included in a data packet, for example, data of the preamble field 320 or the postamble field 330.

Figure 4:
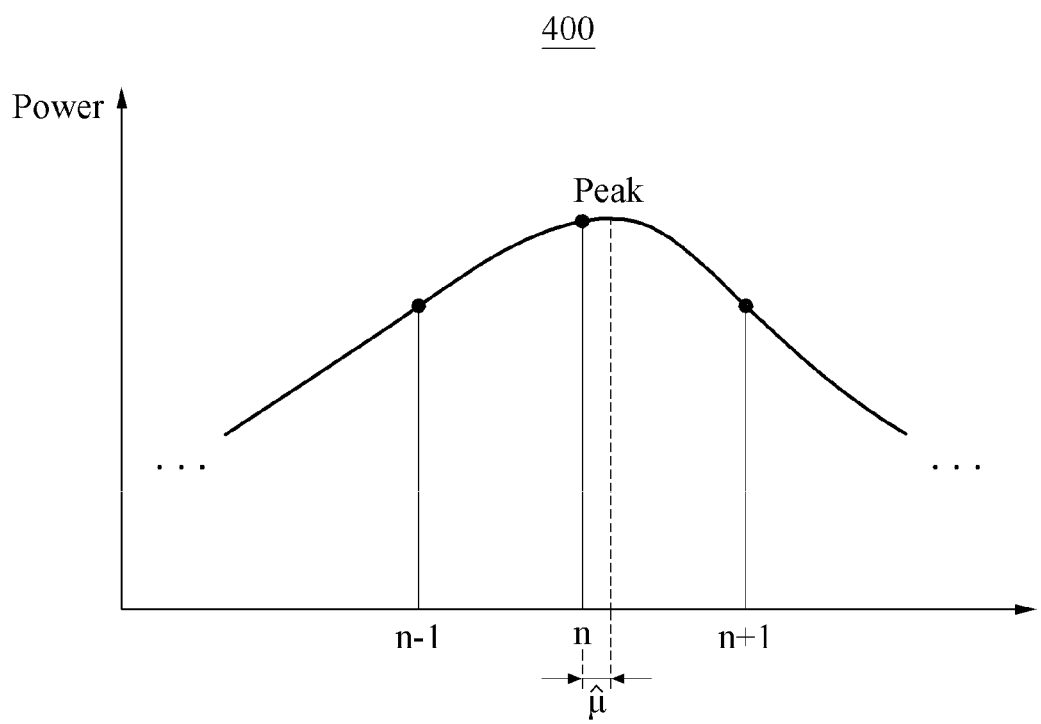
FIG. 4 is a graph illustrating an example of signal power in a frequency domain that is calculated by a symbol timing recoverer based on a sub-correlation window symbol length or period from an oversampled signal according to an example embodiment.

FIG. 4 is a graph 400 illustrating an example of signal power in a frequency domain that is calculated by a symbol timing recoverer based on a symbol length or period of a sub-correlation window from a calculated oversampled signal according to an example embodiment. The symbol timing recoverer may identify power corresponding to a time index associated with a symbol timing. For example, the symbol timing recoverer may identify a time index n with maximum power from among discrete time indices. The symbol timing recoverer may identify power corresponding to each of n−1, n, and n+1 based on the identified time index n. The symbol timing recoverer may apply a polynomial interpolation filter to power corresponding to each of n−1, n, and n+1, and determine an offset, for example, $\hat{\mu}$ as illustrated in FIG. 4, between a point in time at which power is maximized and a time index. An architecture of the polynomial interpolation filter will be described in detail with reference to FIG. 8. Referring to FIG. 4, a peak value of power may occur at n+$\hat{\mu}$. The symbol timing recoverer may determine n+$\hat{\mu}$ to be a sampling location having an optimal SNR. The symbol timing recoverer may determine a symbol timing of an analog signal received by a demodulator based on n+$\hat{\mu}$.

The sampling location determined by the symbol timing recoverer may be used to determine a sampling clock to sample a data packet based on a start point of the data packet that is detected by a burst detector of the demodulator. As described above, the symbol timing recoverer may identify the sampling location having the optimal SNR, and thus the demodulator may sample a point with a highest SNR in the received analog signal.

The symbol timing recoverer of the demodulator may apply different algorithms based on a type of data packet, and thus determine an optimal sampling location, sampling clock, or symbol timing. That is, the symbol timing recoverer may perform an operation different from the operation described with reference to FIGS. 3 and 4 based on a type of data packet, and thus determine an optimal sampling location, sampling clock, or symbol timing. For example, in a case in which a length of a burst included in a data packet is relatively short, for example, the length is less than or equal to a preset threshold, the symbol timing recoverer may perform the operation described with reference to FIGS. 3 and 4 to determine an optimal sampling location, sampling clock, or symbol timing.

Figure 5:
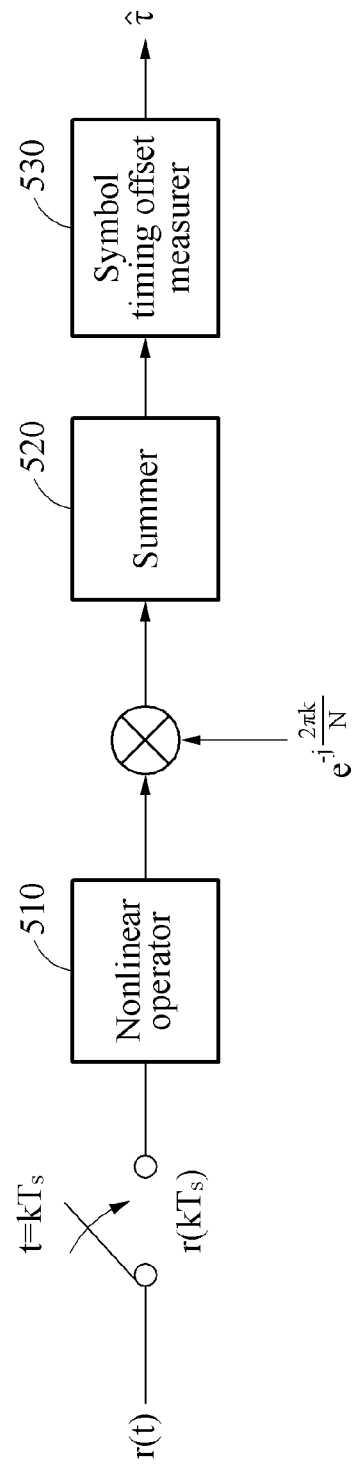
FIG. 5 is a diagram illustrating an example of how a symbol timing recoverer operates in a time domain to determine a symbol timing according to an example embodiment.

FIG. 5 is a diagram illustrating an example of how a symbol timing recoverer operates in a time domain to determine a symbol timing according to an example embodiment. The operation to be described hereinafter with reference to FIG. 5 may be performed in a case in which a length of a burst included in a data packet is relatively long.

A demodulator may detect a start point of the data packet using a burst detector, and then determine a sampling location at which sampling is performed to have a highest SNR using a symbol timing recoverer. The symbol timing recoverer may set a window by a length of the data packet without receiving information associated with the data packet, and then store a signal by the window from the start point of the data packet, for example, by the length of the data packet. The signal may be, for example, a digital signal received by the symbol timing recoverer. The symbol timing recoverer may determine a symbol timing offset $\hat{\tau}$ with respect to the stored signal, based on Equation 1. The symbol timing offset $\hat{\tau}$ may correspond to the sampling location n+$\hat{\tau}$ having an optimal SNR that is described above with reference to FIG. 4.

$$\hat{\tau} = -\frac{T}{2\pi}\arg\left\{\sum_{k=0}^{NL_O-1} |r(kT_s)|^2 e^{-j\frac{2\pi k}{N}}\right\}$$ [Equation 1]

FIG. 5 is a diagram illustrating an example of how the symbol timing recoverer determines the symbol timing offset $\hat{\tau}$ based on Equation 1. In the example of FIG. 5 and Equation 1, r(t) corresponds to a received signal in a continuous time, for example, an analog signal received by the demodulator, and t=kT$_s$ indicates a digital sampling process, for example, a sampling operation performed by an ADC of the demodulator.

Referring to FIG. 5, the symbol timing recoverer includes a nonlinear operator 510 configured to perform a nonlinear operation on the stored signal to extract a sample timing. Referring to Equation 1, the nonlinear operation performed by the nonlinear operator 510 may be, for example, a squaring operation or an absolute value operation. The symbol timing recoverer also includes a summer 520 configured to perform a summation on a result of applying $$e^{-j\frac{2\pi k}{N}}$$

to a result of the nonlinear operation performed by the nonlinear operator 510.

Referring to Equation 1, the summer 520 may perform the summation based on the number of oversampling in a symbol interval, that is, N, which is an oversampling factor and is 4 in general, and a number Lo of symbols for a set window. In addition, T denotes a symbol time. A symbol timing offset measurer 530 may determine the symbol timing offset $\hat{\tau}$ by performing an operation of $$-\frac{T}{2\pi}\arg\{\cdot\}$$

of Equation 1 on an output from the summer 520. The demodulator may apply a second-order interpolation filter to the determined symbol timing offset $\hat{\tau}$, and sample the analog signal by compensating for the symbol timing offset $\hat{\tau}$.

For example, when determining a symbol timing based on Equation 1 or the example described with reference to FIG. 5, demodulation performance of the demodulator may increase as an SNR and L increase and Lo increases. Herein, in a case in which SNR and N are considered deterministic, the demodulation performance may increase as Lo increases. Thus, in a case in which a length of a burst included in a data packet is relatively great, the demodulator may perform the operation of determining a symbol timing based on Equation 1 or the example described with reference to FIG. 5. The operation described above with reference to FIG. 5 may be a non-data-aided operation used to determine the symbol timing without depending on data included in the data packet.

Figure 6:
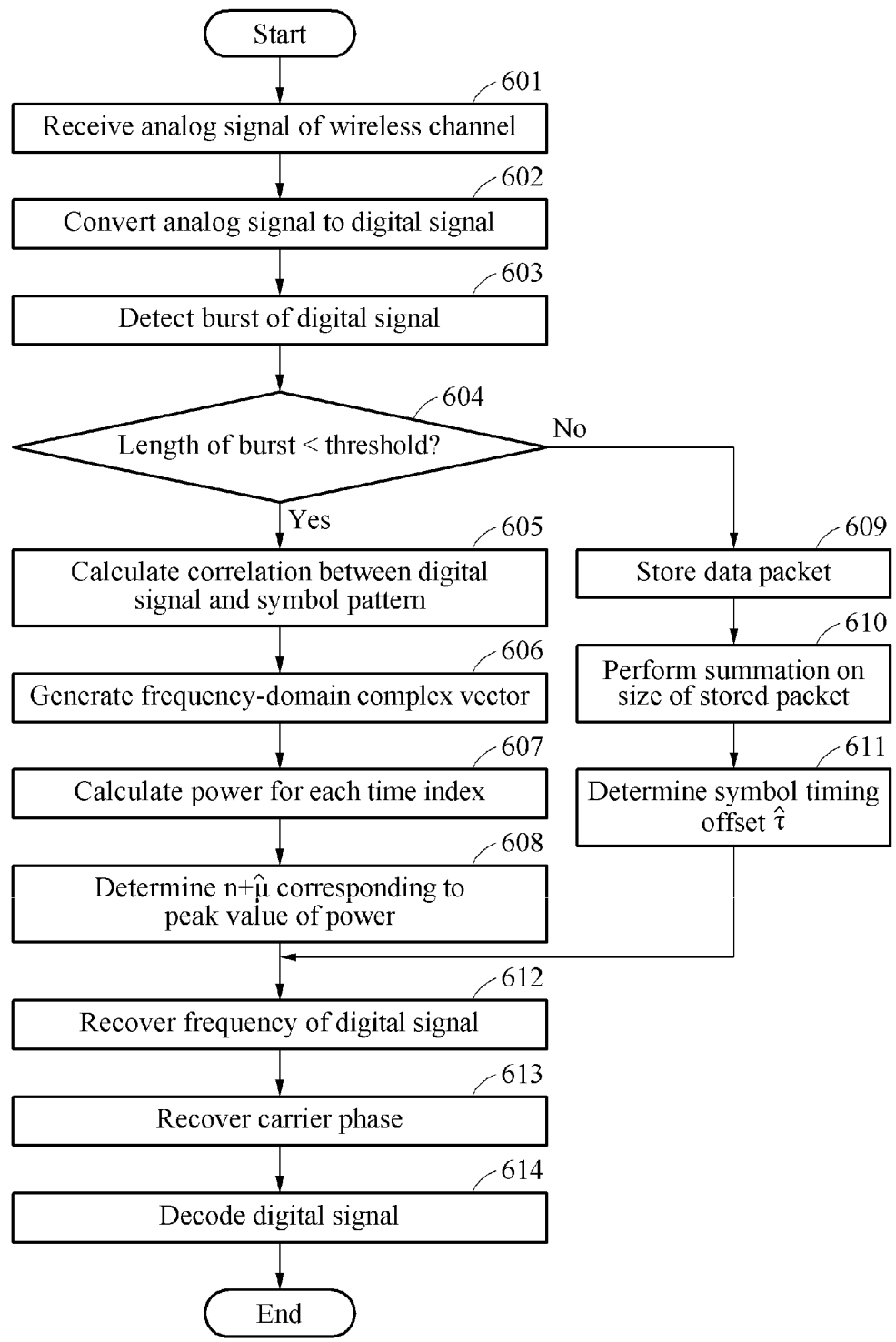
FIG. 6 is a flowchart illustrating an example of operations of a demodulator according to an example embodiment.

FIG. 6 is a flowchart illustrating an example of operations of a demodulator according to an example embodiment.

Referring to FIG. 6, in operation 601, the demodulator receives an analog signal of a wireless channel. The demodulator may change a frequency of the analog signal from a frequency of the wireless channel to an IF, for example, a low IF that is less than the frequency of the wireless channel. The changing may be performed by an LNB included in the demodulator.

In operation 602, the demodulator converts the analog signal to a digital signal. Referring to Equation 1 above, the analog signal r(t) may be sampled at t=kT$_s$, and the demodulator may thus obtain the digital signal, for example, $r(kT_s)$. Alternatively, the demodulator may obtain the digital signal corresponding to the analog signal by sampling the analog signal $r(t)$ based on a preset number of oversampling.

The demodulator may convert a frequency, or an IF, of the obtained digital signal to a frequency of a baseband. In addition, the demodulator may serialize a parallel signal included in the digital signal. The demodulator may input the digital signal to a matched filter thereof.

In operation 603, the demodulator detects a burst included in the digital signal. The demodulator may search for a location of a preset word, for example, an UW, to detect the burst. The demodulator may determine a data packet included in the digital signal, and a type of the data packet, or a type of the burst, by referring to Table 1 above. Herein, a length of the data packet may vary based on a type of the burst.

In operation 604, the demodulator compares a length of the burst included in the digital signal and a preset threshold. Based on the length of the burst, the demodulator may determine different methods to determine a symbol timing of the digital signal.

Herein, in response to the length of the burst being less than or equal to the threshold, the demodulator may determine a symbol timing, a sampling location, or a sampling clock of the received signal based on the operation described above with reference to FIGS. 3 and 4. In detail, in operation 605, the demodulator calculates a correlation between the digital signal obtained through the oversampling based on the number of oversampling per symbol and a preset symbol pattern. For example, in a case in which the data packet included in the digital signal corresponds to the architecture of the data packet illustrated in FIG. 2, a symbol pattern of a preamble field, a postamble field, or a pilot field may be the preset symbol pattern. In such a case, the demodulator may calculate the correlation by combining, with the digital signal obtained through the oversampling, the preset preamble field, the preset postamble field, or the preset pilot field. Such a calculation of the correlation may be performed based on a preset length, for example, a sub-correlation window as illustrated in FIG. 3.

In operation 606, the demodulator generates a time-domain complex signal vector by combining results of correlation calculated based on the sub-correlation window. To perform an FFT operation on the time-domain complex signal vector, a length of the complex signal vector may be $2^n$. To obtain $2^n$ as the length of the complex signal vector, the demodulator may input a preset value, for example, zero, to a remaining field, excluding the results of the correlation.

In operation 607, the demodulator calculates power of the oversampled signal for each time index based on the time-domain complex signal vector. In detail, the demodulator may obtain a frequency-domain complex signal vector by performing an FFT operation on the time-domain complex signal vector. The demodulator may calculate a peak point of signal power by performing a squaring operation on the frequency-domain complex signal vector. The power at the peak point, or maximum power, may be determined based on time indices and magnitudes of power corresponding to the time indices.

In operation 608, the demodulator determines a combination, for example, $n+\hat{\mu}$, of a time index n corresponding to a peak value of the power and an offset $\hat{\mu}$. The demodulator may identify the time index n that maximizes the power from among a plurality of time indices. Based on the identified n, the demodulator may apply a polynomial interpolation filter to power of each of n−1, n, and n+1, and determine the offset $\hat{\mu}$ between the point that maximizes the power and the time index. The determined $n+\hat{\mu}$ may be used to calculate a symbol timing, a sampling location, or a sampling clock.

In response to the length of the burst exceeding the threshold, the demodulator may determine a symbol timing, a sampling location, or a sampling clock of the received signal based on the operation described above with reference to FIG. 5. In detail, in operation 609, the demodulator stores the data packet included in the digital signal as much as a window determined based on the length of the data packet.

In operation 610, the demodulator performs a summation on sizes of stored data packets. The demodulator may perform the summation on the sizes of the stored data packets based on Equation 1. The demodulator may perform the summation on square numbers or absolute values of the sizes of the data packets based on a number N of oversampling and a number Lo of symbols of a window.

In operation 611, the demodulator determines a symbol timing offset $\hat{\tau}$ based on a result of the summation of the sizes of the data packets. The symbol timing offset $\hat{\tau}$ may be determined based on Equation 1 above. The demodulator may apply a second-order interpolation filter and such to the symbol timing offset $\hat{\tau}$. The determined symbol timing offset $\hat{\tau}$ may be used to calculate a symbol timing, a sampling location, or a sampling clock. Thus, the demodulator may decode the received analog signal based on the determined symbol timing offset $\hat{\tau}$ or $n+\hat{\mu}$.

As described, the demodulator may determine a method of determining a symbol timing by selecting one from two: a method of determining a symbol timing based on a correlation between a digital signal and a symbol pattern; and a method of determining a symbol timing by applying a nonlinear operation as in Equation 1 to the digital signal, for example, a summation of square numbers or absolute values of sizes of data packets based on a number N of oversampling, a number Lo of symbols of a window, and a symbol time. The demodulator may determine the symbol timing based on the selected method. That is, the demodulator may select one from the symbol pattern and the nonlinear operation as a parameter to be applied to the digital signal to determine the symbol timing, based on a length of a burst.

In operation 612, the demodulator recovers a frequency of the digital signal. The demodulator uses an ML-based FFT algorithm to recover the frequency of the digital signal.

In operation 613, the demodulator recovers a phase of a carrier wave included in the digital signal. In operation 614, the demodulator decodes the digital signal based on the symbol timing offset $\hat{\tau}$ or $n+\hat{\mu}$. The demodulator may estimate a bit corresponding to a symbol of the analog signal based on a soft-decision, and then perform turbo decoding based on a result of the estimating of the bit to decode the received analog signal.

Figure 7:
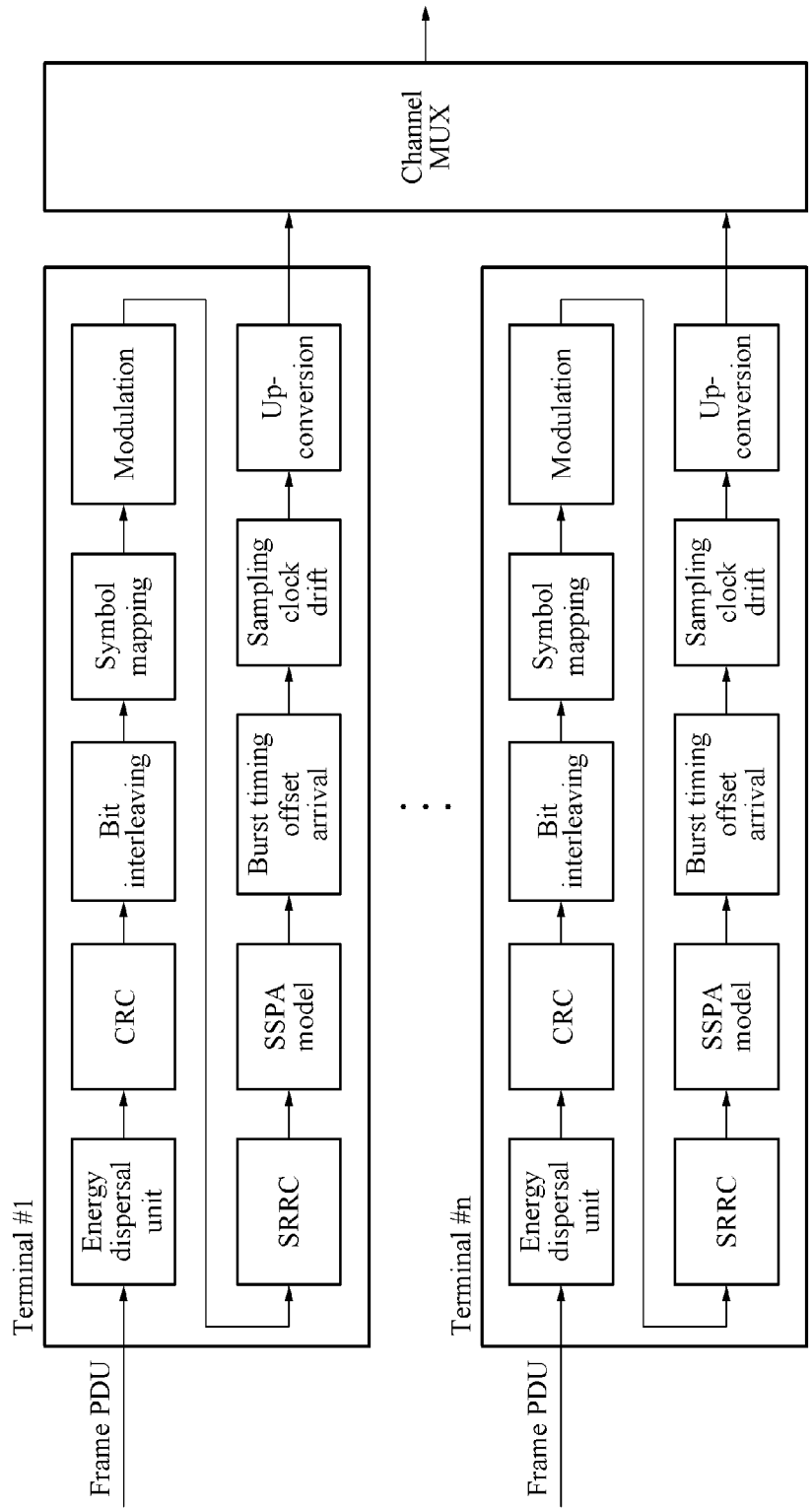
FIG. 7 is a diagram illustrating an example of an architecture of a modulator according to an example embodiment.

FIG. 7 is a diagram illustrating an example of an architecture of a modulator according to an example embodiment. The modulator may be located at a gateway, and based on the DVB-RCS2 standard. The modulator may be included in a transmitting and receiving modem of a user terminal connected to a network or a base station. The modulator to be described hereinafter with reference to FIG. 7 may be disposed at a transmitting end of the user terminal.

A frame protocol data unit (PDU) packet input to the modulator may perform energy dispersal through bit scrambling. A cyclic redundancy check (CRC) bit may be combined with the packet for a packet integrity check. After the CRC bit is combined with the packet, a channel encoding process such as turbo coding and a bit interleaving process to distribute error bits may be performed. Subsequently, at least one preset symbol may be combined with a preamble field, a pilot field, and a postamble field. As described, the preamble field, the pilot field, or the postamble field may be used to recover a symbol timing of a wireless signal that is generated in a demodulator.

In addition, a symbol mapping process may be performed on a bit sequence of a data packet. Subsequently, the modulator may perform pulse shaping using a square-root-raised-cosine (SRRC) filter, digital-to-analog conversion using a digital-to-analog converter (DAC), and frequency up-conversion.

An operation to be performed by the modulator after the pulse shaping is performed is omitted here. While the modulator is generating an analog signal of a wireless channel from the frame PDU packet, amplification may be performed for signal transmission using a solid-state power amplifier (SSPA). A timing offset may occur among a plurality of transmitting terminals connected to the modulator. A plurality of wireless signals generated in a plurality of user terminals, for example, n user terminals where n denotes a positive integer, may be allocated to a two-dimensional (2D) space, that is, a time domain and a frequency domain, to be transmitted, and multiplexed by a channel multiplexer (MUX).

Figure 8:
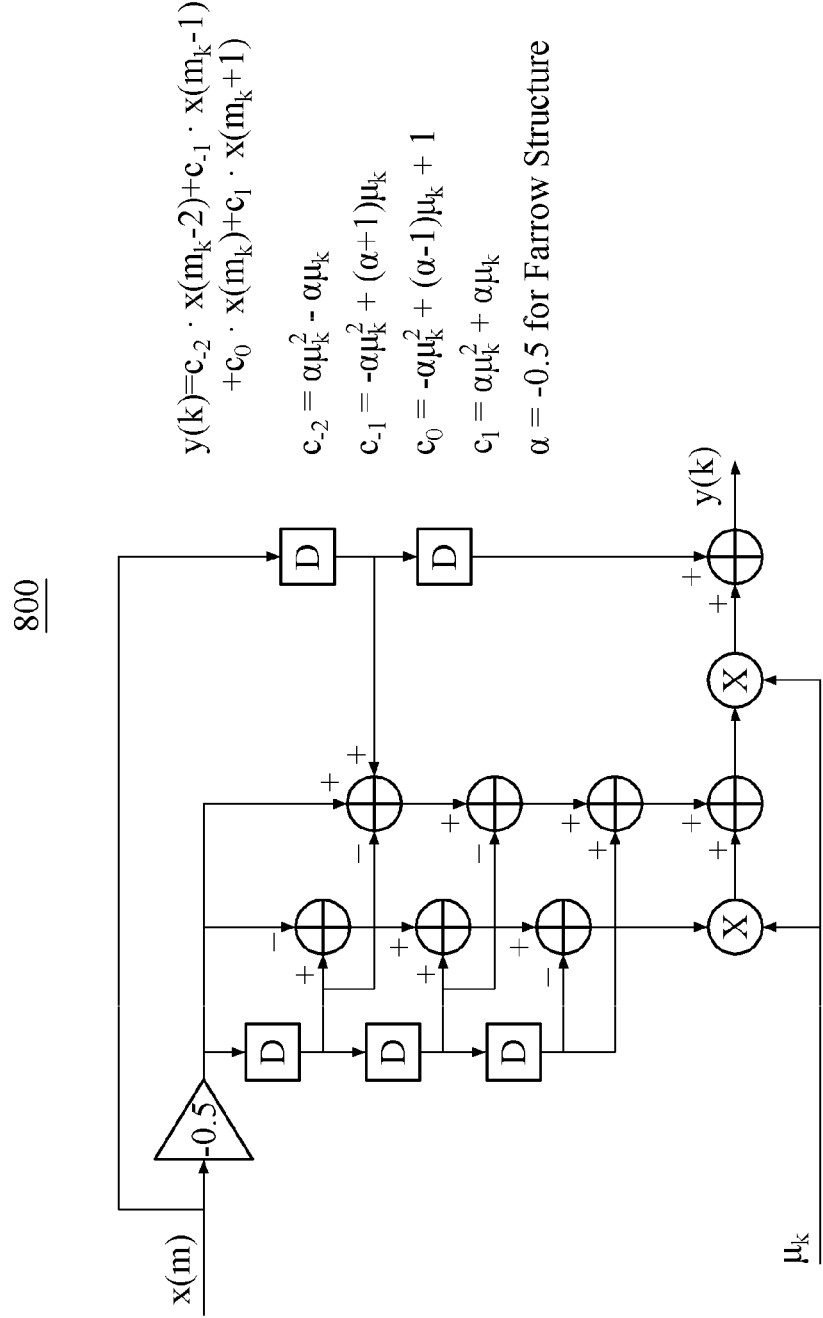
FIG. 8 is a diagram illustrating an example of operations of a polynomial interpolation filter applied to a symbol timing recoverer according to an example embodiment.

FIG. 8 is a diagram illustrating an example of operations of a polynomial interpolation filter 800 applied to a symbol timing recoverer according to an example embodiment.

The polynomial interpolation filter 800 may be a second or higher order interpolation filter used to calculate discrete samples and a point between the samples. Referring to FIG. 8, time indices may be indices of discrete times, and n−1 may correspond to $m_k-1$, n to $m_k$, and n+1 to $m_k+1$.

Figure 9:
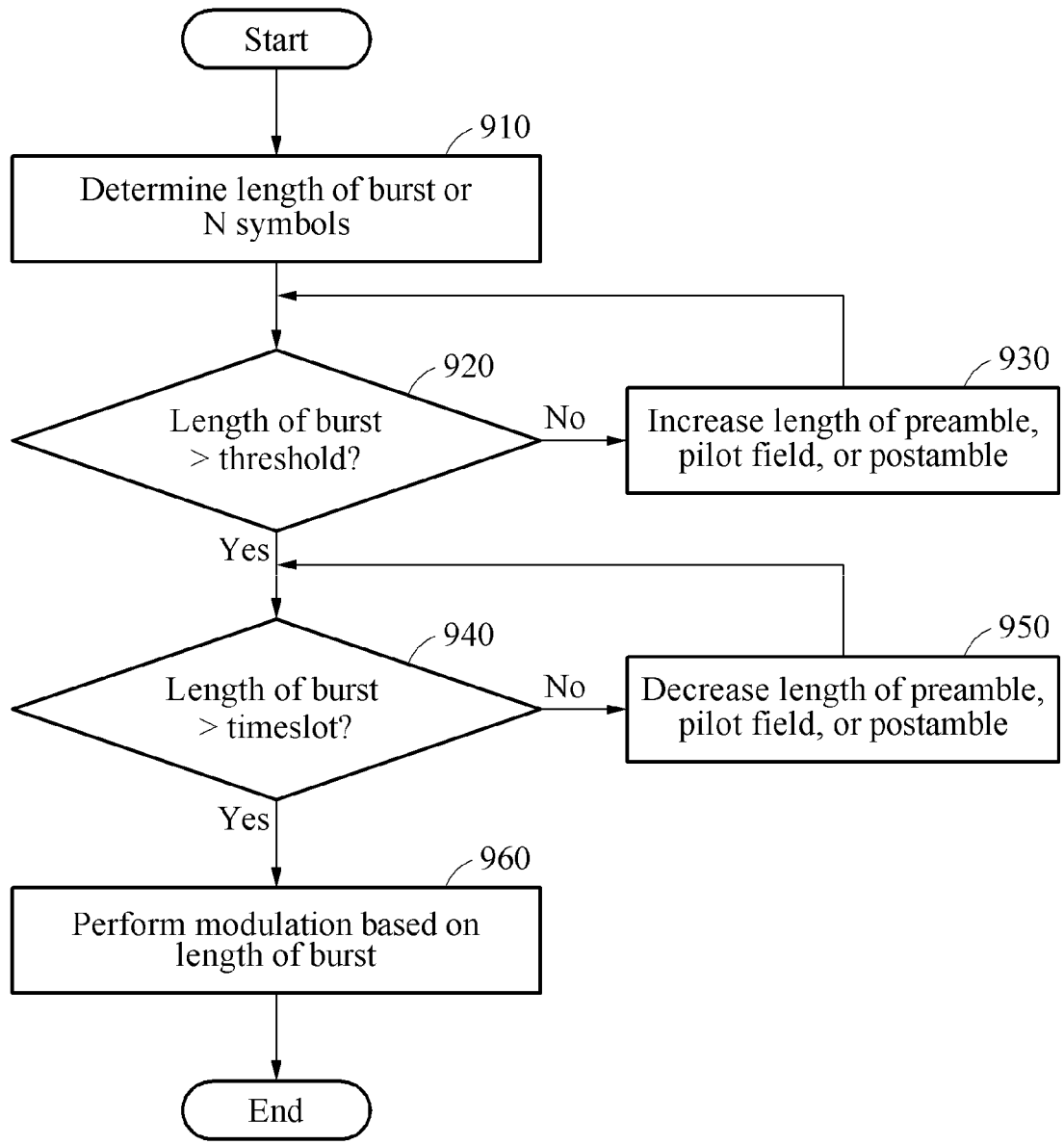
FIG. 9 is a flowchart illustrating an example of operations of a modulator according to an example embodiment.

FIG. 9 is a flowchart illustrating an example of operations of a modulator according to an example embodiment.

Referring to FIG. 9, in operation 910, a modulator determines a length of a burst, for example, N symbols, to be transmitted. The modulator may determine an analog signal to be transmitted to a demodulator, or the length of the burst, based on a length of received payload data. In operation 920, the modulator compares the determined length of the burst, for example, the N symbols, to a preset threshold. The threshold may be determined in advance based on noise and a wireless channel environment. The threshold may be adjusted or optimized based on a performance evaluation at a receiving end including the demodulator.

In operation 930, in response to the length of the burst, or the N symbols, being less than or equal to the threshold, the modulator increases a length of a preamble, a pilot field, and a postamble that is used to modulate the burst. For example, the modulator may increase the length of the preamble, the pilot field, and the postamble to be greater than a preset value. In operation 940, in response to the length of the burst, or the N symbols, being greater than the threshold, the modulator compares the length of the burst, or the N symbols, to a timeslot. In operation 950, in response to the length of the burst, or the N symbols, being greater than or equal to the timeslot, the modulator decreases the length of the preamble, the pilot field, and the postamble.

The comparison of the length of the burst to the threshold and the timeslot may be repetitively performed. Thus, the length of the preamble, the pilot field, and the postamble may change repetitively. As the length of the preamble, the pilot field, and the postamble changes repetitively, the length of the burst, or the N symbols, may also change repetitively. The length of the burst, or the N symbols, may be determined based on a length of the timeslot. For example, the length of the burst, or the N symbols, may be limited by the length of the timeslot. The length of the burst, or the N symbols, may be adjusted such that the length of the preamble, the pilot field, and the postamble may be less than or equal to the timeslot while exceeding the threshold.

In operation 960, in response to the length of the burst, or the N symbols, being less than the timeslot, the modulator modulates the payload data to be transmitted to the receiving end based on the length of the burst, or the N symbols. The modulator may generate an analog signal to be transmitted to the receiving end based on the payload data. Herein, a length of the analog signal may correspond to the determined length of the burst, or the N symbols. The length of the preamble, the pilot field, and the postamble that is adjusted based on the threshold or the timeslot may be used to modulate the burst.

Because the modulator adjusts the length of the burst based on at least one of the threshold or the timeslot, a complexity of the demodulator may be reduced, and a performance loss of the demodulator may be minimized.

The operations described above with reference to FIG. 9 may relate to a transmission architecture in which a length of a preamble, a user pilot field, and a postamble is extended in response to a length of a burst being less than or equal to a threshold, and the length of the preamble, the user pilot field, and the postamble is reduced in response to the length of the burst being greater than the threshold, which is as a method used to restrict a selective use of a symbol timing recoverer at a receiving end based on a packet length, and to reduce a complexity of the demodulator and minimize a performance loss of the demodulator. Herein, the threshold may be affected by noise and a wireless channel environment, and be generally optimized through a performance evaluation at the receiving end.

Concisely, the present disclosure relates to a demodulation method used to recover data from a signal received by a device receiving a data packet when the data packet is transmitted in wired and wireless communications. In detail, the device receiving the data packet may recover or synchronize a symbol timing used to recover the data. A demodulator included in the device receiving the data packet may determine the symbol timing based on a length of a burst included in the data packet using a demodulation method among different demodulation methods, for example, a demodulation method that has a relatively better performance based on the length of the burst. For example, in response to the length of the burst being relatively short, the demodulator may determine the symbol timing of the data packet based on a preset symbol pattern of a preamble field, a pilot field, or a postamble field. Thus, even when the length of the burst is relatively short, performance of the demodulator in recovering or synchronizing the symbol timing may be improved. Conversely, in response to the length of the burst being relatively long, the demodulator may determine the symbol timing of the data packet by performing a nonlinear operation such as Equation 1 on the data packet. The determined symbol timing may be used to determine a sampling clock to be used to recover the data.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A demodulation method performed by a demodulator to demodulate an analog signal, the demodulation method comprising:
   converting the analog signal to a digital signal;
   identifying a type of a burst included in the digital signal; and
   determining a sampling clock to be used to sample the analog signal based on the identified type of the burst,
   wherein determining the sampling clock comprises:
   determining a symbol timing to be used to determine the sampling clock based on the identified type of the burst or a length of the burst;
   in response to the length of the burst being less than or equal to a preset threshold, calculating a correlation between the digital signal and a preset symbol pattern;
   obtaining a time-domain complex signal vector corresponding to the digital signal by combining calculated correlations; and
   determining a power distribution of the digital signal to be used to determine the sampling clock, based on the obtained complex signal vector.

2. The demodulation method of claim 1, wherein the calculating of the correlation comprises:
   calculating the correlation between the digital signal and the symbol pattern by each preset sub-correlation window unit.

3. The demodulation method of claim 1, wherein the determining of the power distribution comprises:
   identifying a time index that is closest to a maximum value of the power distribution and an offset between the time index and the maximum value of the power distribution.

4. The demodulation method of claim 1, wherein determining the sampling clock further comprises:
   in response to the length of the burst being greater than the preset threshold, applying, to the digital signal, a non-linear operation based on the number of oversampling per symbol used to obtain the digital signal and the number of symbol included in a window corresponding to the digital signal.

5. A modulation method performed by a modulator, the modulation method comprising:
   determining a length of a burst to be transmitted to a demodulator corresponding to the modulator based on a length of payload data;
   comparing the determined length of the burst to a preset threshold and a timeslot;
   determining a length of at least one of a preamble, a pilot field, or a postamble that is associated with the burst, based on a result of comparing the length of the burst to the preset threshold and the timeslot; and
   modulating the payload data to generate the burst based on the determined length of the at least one of the preamble, the pilot field, or the postamble.

6. The modulation method of claim 5, wherein the determining of the length of the at least one of the preamble, the pilot field, or the postamble comprises:

in response to the length of the burst being less than or equal to the threshold, increasing the length of the at least one of the preamble, the pilot field, or the postamble.

7. The modulation method of claim 5, wherein the determining of the length of the at least one of the preamble, the pilot field, or the postamble comprises:

in response to the length of the burst being less than the timeslot, decreasing the length of the at least one of the preamble, the pilot field, or the postamble.

8. A demodulation method performed by a demodulator to demodulate an analog signal, the demodulation method comprising:

converting the analog signal to a digital signal;

identifying a length of a burst included in the digital signal;

determining a symbol timing of the analog signal using the digital signal based on the identified length of the burst, determining the symbol timing comprising:

selecting, based on the identified length of the burst, either a first process that uses a symbol pattern or a second process that uses a nonlinear operation, and determining the symbol timing the selected; and demodulating the digital signal based on the determined symbol timing.

9. The demodulation method of claim 8, wherein the determining comprises at least one of:

in response to the length of the burst being less than or equal to the threshold, determining the symbol timing based on a relationship between the digital signal and the symbol pattern; or in response to the length of the burst being greater than the threshold, determining the symbol timing by applying the nonlinear operation to a data packet included in the digital signal.

10. The demodulation method of claim 9, wherein the determining of the symbol timing based on the relationship between the digital signal and the symbol pattern comprises:

calculating a correlation between the digital signal and a preset symbol pattern of a preamble field, a postamble field, or a pilot field;

generating a time-domain complex signal vector of the digital signal from the calculated correlation;

measuring power of the digital signal from the generated complex signal vector; and determining the symbol timing based on a peak value of the measured power.

11. The demodulation method of claim 9, wherein the determining of the symbol timing by applying the nonlinear operation to the data packet comprises:

applying, to the data packet, the nonlinear operation based on the number of oversampling per symbol or the number of symbol included in a window corresponding to the digital signal to determine a size of the data packet used to determine the symbol timing.

* * * * *